United States Patent [19]

Becker

[11] Patent Number: 4,913,466

[45] Date of Patent: Apr. 3, 1990

[54] INNER PIPE MEMBER FOR DUAL-WALL DRILL PIPE ASSEMBLY

[75] Inventor: Floyd W. Becker, Calgary, Canada

[73] Assignee: Drill Systems International Ltd., Calgary, Canada

[21] Appl. No.: 221,647

[22] Filed: Jul. 20, 1988

[30] Foreign Application Priority Data

Jul. 20, 1987 [CA] Canada ................................ 542532

[51] Int. Cl.$^4$ ........................ E21B 17/18; F16L 35/00
[52] U.S. Cl. ...................................... 285/24; 166/241; 175/215; 175/320; 285/133.1; 285/304
[58] Field of Search ............... 175/215, 173, 320, 321; 138/112, 113, 114; 29/455 R; 285/24, 133.1, 138, 304; 166/241, 242

[56] References Cited

U.S. PATENT DOCUMENTS

| | | | |
|---|---|---|---|
| 1,204,310 | 4/1912 | Canfield | 175/320 |
| 3,871,486 | 3/1975 | Curington et al. | 175/215 X |
| 4,274,663 | 6/1981 | Becker et al. | 175/173 X |
| 4,337,563 | 7/1982 | Becker et al. | 175/215 X |

Primary Examiner—Stephen J. Novosad
Attorney, Agent, or Firm—Hayes, Soloway, Hennessey & Hage

[57] ABSTRACT

An inner pipe member for a dual-wall drill pipe assembly having an inner pipe member and an outer pipe member, the outer pipe member having a main bore extending axially therethrough including a first bore and a concentric second bore of smaller diameter than the first bore and axially spaced therefrom by a shoulder, and a circumferential recess in the second bore, the inner pipe member comprising a tubular body portion adapted to be telescopically and concentrically received in the main bore and define an annular fluid passage therewith, a first spacer at one end of the body portion for concentrically spacing the one end of the body portion from the other end of the outer pipe member, and a second spacer at the other end of the body portion, the second spacer including first and second surfaces adapted to be received in sliding fit relation within the first and second bore, respectively, for concentrically positioning the other end of the inner pipe member within the outer pipe member, and a projection extending radially outwardly of the second surface and adapted to be received in the recess when the inner pipe member is operatively disposed within the outer pipe member, the projection having an outer surface slidable in the second bore in interference fit relation therewith.

17 Claims, 3 Drawing Sheets

INNER PIPE MEMBER FOR DUAL-WALL DRILL PIPE ASSEMBLY

This invention relates to a dual-wall drill pipe section for use in a drill string for drilling in earth formations.

BACKGROUND OF THE INVENTION

Dual-walled drill pipe used for drilling bore holes in earth formations are well known. Generally, bore holes are formed by rotating or percussively-rotating a drill string, which may be up to several hundred feet in length, into an earth formation using a drilling apparatus or rig. The drill string is comprised of an outer pipe string, to the lower end of which is connected a drill bit, and an inner pipe string. The inner and outer pipe strings together define an annular passageway for communicating fluid, such as air, to the bottom of the bore hole while the inner pipe string defines a bore which serves to return the air and cutting bits to the surface.

The outer pipe string is formed by a plurality of lengths of pipe threadedly connected in end-to-end relation with each length being about ten feet in length. The outer pipe string serves to transfer the rotary and/or percussive forces to the cutting or drill bit, absorb pull up forces, which must be sufficient to overcome friction in the bore hole and the weight of both the outer and inner pipe strings when extracting the drill string. It must also carry its own weight which may be substantial depending upon the length of the drill string. Accordingly, the outer pipe string is a high strength assembly which must be designed to withstand these loads.

The inner pipe string is also formed by a plurality of serially connected lengths of pipes although not necessarily threadedly connected, each being normally about ten feet in length. The primary function of the inner pipe string is to define the two above-mentioned fluid passageways. It need not transfer rotary or percussive forces of the drill bit and, accordingly, need not meet the same high strength requirements of the outer pipe string. Thus, it may be constructed of thinner walled tube. Nevertheless, since the drill string may have considerable length, the weight imposed upon the lower lengths of inner pipe is still substantial. Thus, heretofore, it has been necessary to provide an inner pipe member having a larger thickness than would be necessary if the substantial weight of the inner pipe string were not a factor. This results in greater weight and cost of the drill string.

A further difficulty associated with drill strings is the storage, handling and assembling of pipe strings. Conventionally, the outer and inner pipe members are stored in separate racks adjacent the drilling site and the inner pipe members are inserted within the outer pipe members when the drill string is being assembled. The inner pipe member may be pre-mounted in an associated outer pipe member but this results in difficulty in handling in that the inner pipe member telescopically slides inwardly and outwardly of the outer pipe member with the not infrequent result of damage to one or both ends of the rather fragile inner pipe member.

Canadian Application Ser. No. 496,949, filed Feb. 24, 1982 issued as Canadian Patent No. 1,159,442 on Dec. 27, 1983 describes a dual-wall drill pipe assembly in which inner and outer pipe members are formed with cooperating shoulders which, when engaged, serve to locate the inner pipe member within the outer pipe member and transfer the weight of the inner pipe member, and any other axial loads applied to the inner pipe member, directly to its associated outer pipe member. As a result, the inner pipe members at the lower end of the inner drill string need not absorb any more load than the inner pipe members at the upper end of the drill string. This arrangement thereby considerably reduces the strength requirements, size and cost of the inner pipe string. There is also described releasable retaining means in the form of longitudinally extending leaf springs disposed between the inner and outer pipe members to permit preassembly of dual-walled drill pipe sections, facilitate storage and handling of drill pipe sections and assembling and dismantling of drill strings. While this arrangement has proven to be quite satisfactory, successful and superior to conventional dual-wall pipe arrangements, the leaf springs are relatively expensive to manufacture and assemble and may damage down hole tools and/or inner and outer pipe members together if a spring breaks during operation.

SUMMARY OF THE INVENTION

The present invention seeks to provide a dual-walled drill pipe arrangement which overcomes the aforementioned difficulties and, more specifically, provides an easily and economically manufactured arrangement for holding the inner and outer pipe members in predetermined operative, axial engagement but allowing the members to release upon application of a suitable, axial separating force.

In accordance with the present invention, there is provided a dual-wall drill pipe assembly for use in drilling in earth formations comprising an inner pipe member having an outer surface, an outer pipe member having an inner surface defining a passage extending axially through the outer pipe member and being adapted to receive the inner pipe member in concentrically spaced relation whereby to form an annular fluid flow passage between the inner and outer surfaces, and means for maintaining the inner and outer pipe members in predetermined axial relation including a circumferential recess formed in one of the surfaces, and a projection extending from the other of the surfaces toward the one surface and being adapted to be received in the recess in the predetermined axial relation of the inner and outer pipe members. The projection is dimensioned to form an interference sliding fit with the one surface so that its edges engage the side of the recess and prevent or resist axial displacement of the inner and outer pipe members when axial separating forces are applied to the inner and outer pipe members. The recess is larger in diameter and longer in the axial direction than the projection so as to allow free axial movement, within limits, when axial, percussive loads are applied to the outer string.

BRIEF DESCRIPTION OF THE DRAWINGS

These and other features of the invention will become more apparent from the following description in which reference is made to the appended drawings wherein:

FIG. 4 is broken, longitudinal cross-sectional view of an inner pipe member constructed in accordance with a preferred embodiment of the present invention;

FIG. 5 is a left end view of the inner pipe member illustrated in FIG. 4;

DETAILED DESCRIPTION OF PREFERRED EMBODIMENT

Figure 1:
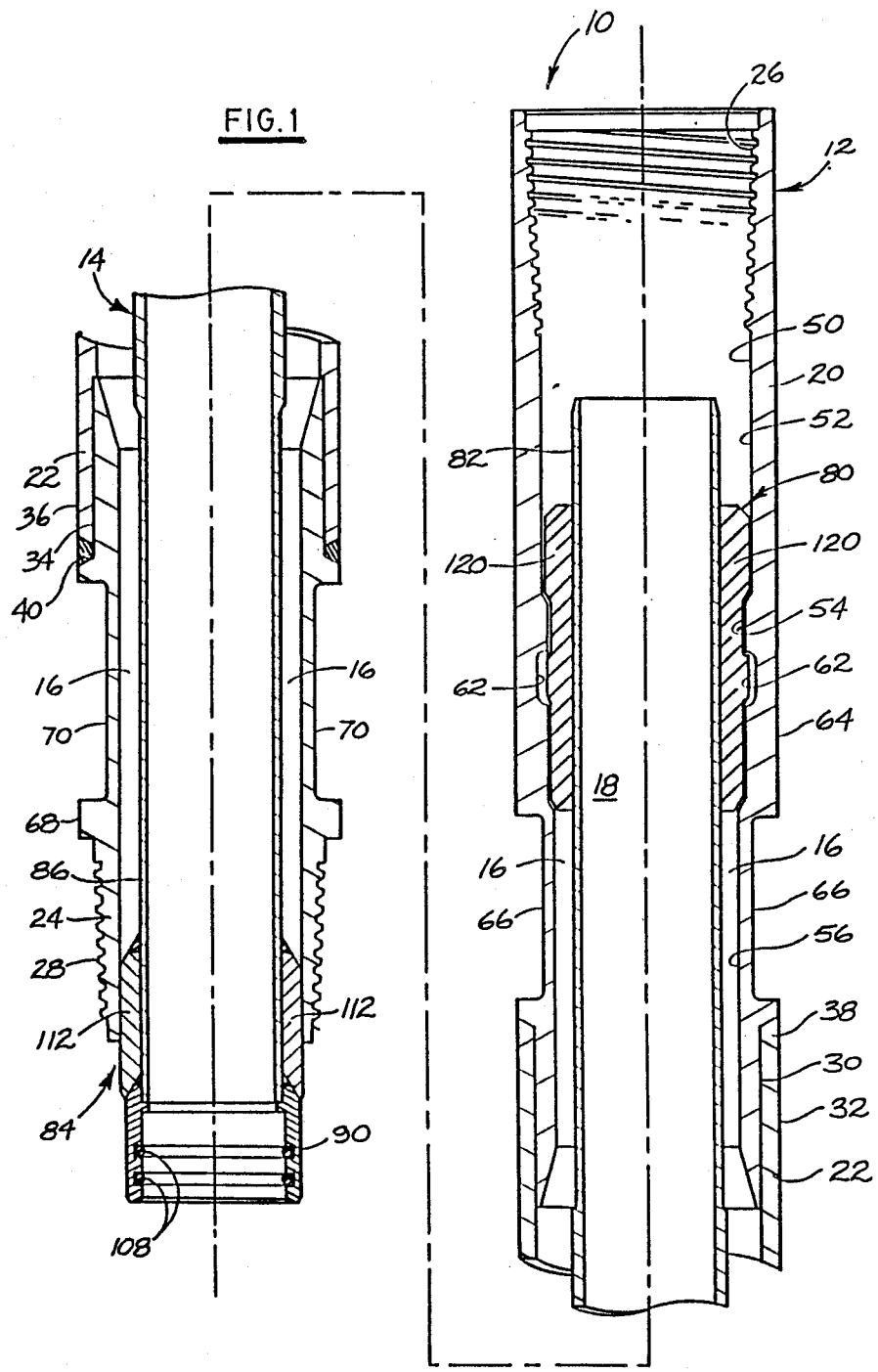
FIG 1 is a broken, longitudinal cross-sectional view of a dual-wall drill pipe assembly illustrating an inner pipe member operatively positioned and retained within an outer pipe member.

With reference to FIG. 1, the dual-wall drill pipe assembly of the present invention, generally designated by reference numeral 10, is generally comprised of an outer pipe member 12 and an inner pipe member 14. The inner and outer pipe members are adapted to be preassembled together as an assembly to facilitate storage and handling. During the drilling procedure, the assemblies are secured together in end-to-end relation with the outer pipe members being threadedly secured together and the inner pipe member being telescopically engaged in sealing relation. The inner and outer pipe members together define an annular passageway 16 which serves to communicate a drilling fluid from the surface to the cutting bit at the bottom of a bore hole. The inner pipe member defines a fluid passageway 18 for communicating the fluid and cutting chips from the bottom of the bore hole to the surface.

The dual-wall drill pipe assembly of the present invention provides a simple, easily and economically constructed arrangement by which the inner and outer pipe members are axially and concentrically retained in assembled relation during handling and by which the inner pipe member is vertically supported by the outer pipe member when assembled as a drill string so as to minimize the strength requirements of the inner pipe member as well as failure of the inner pipe tubing.

Figure 3:
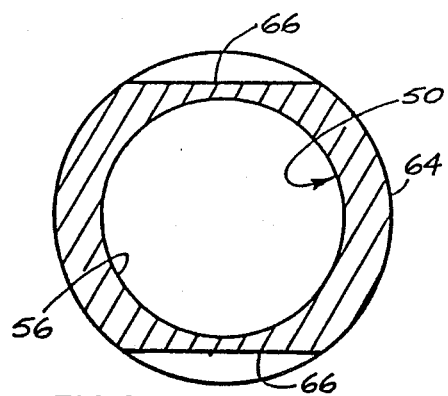
FIG. 3 is a transverse cross-sectional view taken along line 3—3 of FIG. 2.
Figure 2:
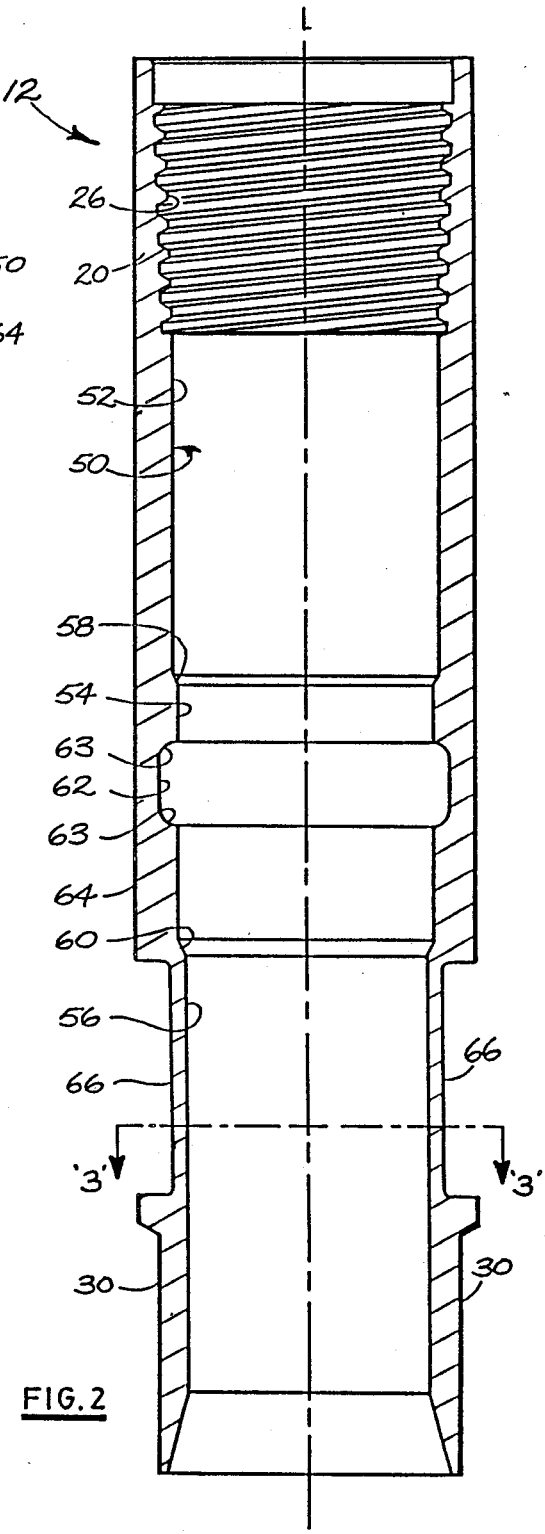
FIG. 2 is a longitudinal cross-sectional view of a box member which forms the upper end of the outer pipe member.

With particular reference to FIGS. 2 and 3 of the drawings, the outer pipe is generally comprised of three components in order to facilitate manufacture. More specifically, the outer pipe member is comprised of a box 20, an elongated tube 22 and a pin 24 of uniform outside diameter as shown. As is well known, the box 20 usually constitutes the upper end of the drill pipe while the pin 24 constitutes the down hole end of the pipe.

Box 20 is formed with an internal thread 26 at its free end while pin 24 is formed with an external thread 28 for engagement with thread 26 of the box of another outer pipe member. The opposite end of box 20 is formed with a reduced diameter portion 30 for reception within upper end 32 of tube 22. Similarly, the end of pin 24 remote from thread 28 is formed with a reduced diameter portion 34 for reception within the opposite or down hole end 36 end of tube 22. Box 20 and pin 24 are welded to their respective ends of tube 22 as by welds 38 and 40, respectively.

Box 20 is formed with a stepped bore 50 including a first large diameter bore portion 52 at the upper end of the box, a second, intermediate bore portion 54 and a third, small diameter bore portion 56 at the down hole end of the box. The first and second bore portions are separated by a first, inner conical shoulder 58 while the second and third bore portions are separated by a second, inner conical shoulder 60. Shoulders 58 and 60 are formed at an angle of 30° to the axis of the box. An inner, circumferential recess 62 is formed in intermediate bore portion 54 to receive a retaining means described later. Recess 62 is preferably formed with tapered or curved side or circumferential surfaces 63; however, it is to be understood that the side or end surfaces of the recess may be radial or perpendicular to the bore of the outer pipe. The outer surface 64 of the box is formed with a pair of diametrically opposed, planar recesses 66 to facilitate separation of two adjacent pipe assemblies as well known in the art. The outer surface 68 of pin 24 is formed with similar diametrically opposed, planar transverse recesses 70. As will become clearer later, shoulders 58 and 60 are engageable with corresponding, mating shoulders on the inner pipe member and serve to transmit axial loads from the inner pipe member directly to the outer pipe member.

With reference to FIGS. 4 and 5 of the drawings, inner pipe member 14 is formed with a first spacer means 80 at its upper end 82 and a second spacer means 84 at its down hole end 86. A tubular connector member 90 is secured to the lower end 86 of the inner pipe member and includes a bore 94 formed with an annular rib 96 defining opposed annular shoulders 98 and 100. Rib 96 defines an upper bore portion 102 and a lower bore portion 104. Bore portion 102 telescopically receives the lower end 86 of tube 14 to which the upper end of the connector is welded at 106 as shown in FIG. 3. Lower bore portion 104 is adapted to telescopically and sealingly receive the upper end 82 of another inner pipe member. It will be noted that the rib and the bore portions of the connector are formed so as to define a continuous passageway along the entire length of the drill string. A pair of O-rings 108 are disposed in grooves 110 to seal adjacent ends of connected inner pipe members.

Second spacer means 84 includes a plurality of longitudinally upwardly extending, equally angularly spaced spacer members 112 which serve to both concentrically dispose the lower end 90 of the inner pipe member 14 within outer pipe member 12 and reinforce or protect lower end 86 of inner pipe member 14. As is indicated in FIG. 1, the lower end of the inner pipe projects axially outwardly of the lower end of the outer pipe member and, thus, is subject to damage during storage and handling. However, spacer members 112 serve to reinforce the end of the inner pipe member. Members 112 are in the form of bars of steel of rectangular cross-section welded to the outer surface of the inner pipe member.

Figure 6:
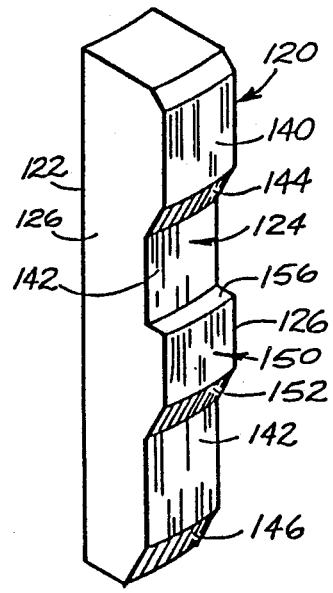
FIG. 6 is perspective view of a retaining and spacing member according to the present invention.

First spacer means 80, disposed at the upper end of the inner pipe, is comprised of a plurality of elongated, longitudinally extending, equally angularly spaced spacer members 120. With particular reference to FIG. 6, each spacer member 120 is of the form of a bar of metal having an inner surface 122 which is secured to the outer surface of the inner pipe, an outer longitudinal surface generally designated by reference numeral 124 which is engageable with bore 50 of the outer pipe, as explained below, and a pair of opposed side surfaces 126. Adjacent side surfaces 126 of adjacent spacer members 120, the outer surface of the inner pipe and the bore of the outer pipe together define a longitudinally extending fluid channel 128 in aforementioned annular fluid passageway 16.

Outer surface 124 of each spacer member 120 includes a first longitudinal surface 140 and a second longitudinal surface 142 constructed to form a sliding fit with respect to bore portions 52 and 54, respectively, of box 20. The magnitude of the sliding fit clearance is prescribed in accordance with standard engineering practice. For a 3½" O.D. pipe, a clearance in the order of 0.010" would be adequate for this purpose. Surfaces 140 and 142 are axially separated from one another by a first outer conical shoulder 144 which is engageable with inner conical shoulder 58 of box 20. A second outer conical shoulder 146 is formed on the down hole end of the spacer member and is engageable with inner conical shoulder 60 of box 20. Thus, when the assembly is disposed in an upright position, the weight of the inner pipe member is transmitted to the outer pipe member by shoulders 58, 144 and 60, 146.

A projection or protrusion, generally designated by numeral 150, extends radially outwardly from surface 142 of each spacer member 124 and includes a tapered down hole end 152 extending from surface 142 to a surface 154. While end 152 is preferably tapered, it is to be understood that it may be at right angles to the outer surface of the inner pipe. An upper end surface or shoulder 156 extends from surface 154 to surface 142 at right angles thereto but could be at any angle.

The projection is arranged to be received in recess 62 when the inner pipe member is operatively assembled within the outer pipe member. Surface 154 is dimensioned so as to form an interference fit with bore portion 54 of bore 50 of the box. The magnitude of the interference should be such as to enable the inner pipe member to be introduced into the outer pipe member without undue difficulty and without damaging the strap while preventing axial separation of the pipe members for axial separation forces below a suitable threshold force. Preferably, the magnitude of interference is arranged so that the material remains in the elastic range during assembly and disassembly of the inner and outer pipe members. It will be understood that the magnitude of the interference and of the separation force will depend on the size of the pipe used. Smaller pipe members will require relatively small interference fits and threshold separation forces while, conversely, larger pipe members will require relatively large interference fits and threshold separation forces. For 3½" O.D. pipe, a threshold force of about 500 pounds and interference in the order of 0.007" to 0.013" has ben determined to be adequate for the purposes of the present invention. Upper end surface 156 is axially spaced from shoulder 144 so as to be disposed adjacent upper side surface 63 of recess 62 of the box and to be engageable therewith to resist axial separation of the inner and outer pipe members. The width (axial) of the recess is longer than the width (axial) of the projection to allow some axial travel of the inner pipe member with respect to the outer pipe member when percussive loads are applied to the outer pipe. It will be seen that tapered surface 152 serves to facilitate passage of projection 150 passed the portion of bore 54 between shoulder 58 and recess 62 and prevent damage to the projection while tapered surface 63 facilitates separation of the inner and outer pipe members but does so with sufficient resistance so as to effectively hold the inner and outer pipe members in assembled relation. It has been found that this arrangement can undergo repeated assembly and disassembly without any appreciable damage to either pipe member. Thus, the above described retaining means is believed to be superior to other currently known pipe retaining means in that it is easily and economically manufactured and has no moving parts which could break and bind two pipe members together and possibly damage the pipe members, downhole tools, etc.

In order to assemble a pipe section, the lower end 86 of an inner pipe member is inserted into box end 20 of an outer pipe member and telescopically moved along the outer pipe member until tapered surface 152 of projection 150 engages shoulder 58 of the box. A greater axial force is then required to force the projection passed the upper end of bore 54 until the projection enters recess 62 and shoulders 58, 144 and 60, 146, respectively, engage. To separate the two pipe members, axial separating forces in the order of 500 to 1,000 pounds on smaller pipe sizes, and more on larger pipe sizes, are required to overcome the resistance offered by engagement between surface 156 of the projection and surface 63 of the recess. It will be appreciated, therefore, that the retaining means is quite adequate to prevent unwanted, inadvertent separation of the pipe members.

It will be appreciated various modifications and alterations may be made to the above described arrangement without departing from the spirit of the present invention as defined by the appended claims. For example, it will be understood that the spacer members 124 may be replaced by a unitary sleeve whose outer longitudinal profile is the same as that of members 124 and provided with longitudinal fluid passages forming the aforementioned annular fluid passage. The spacer means may also be in the form of a unitary sleeve formed with equally angularly spaced radial projections similar to member 124. These arrangements would reduce the number of welding operations but would decrease the cross-sectional area of the fluid passage. It will also be understood that the spacers could be secured to the bore of the box member while suitable mating surfaces are formed on the outer surface of the inner pipe member.

Still further, abutments 58 and 60 could be replaced by a single larger shoulder at the downhole end of recess 62, depending on the size of the pipe and the amount of space available.

Figure 7:
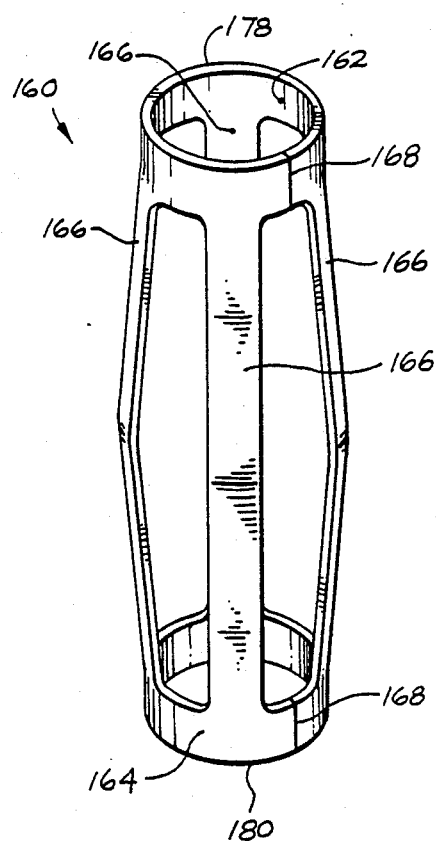
FIG. 7 is a perspective view of a spring member adapted to be interposed between the inner and outer pipe members of longer drill pipe assemblies.
Figure 8:
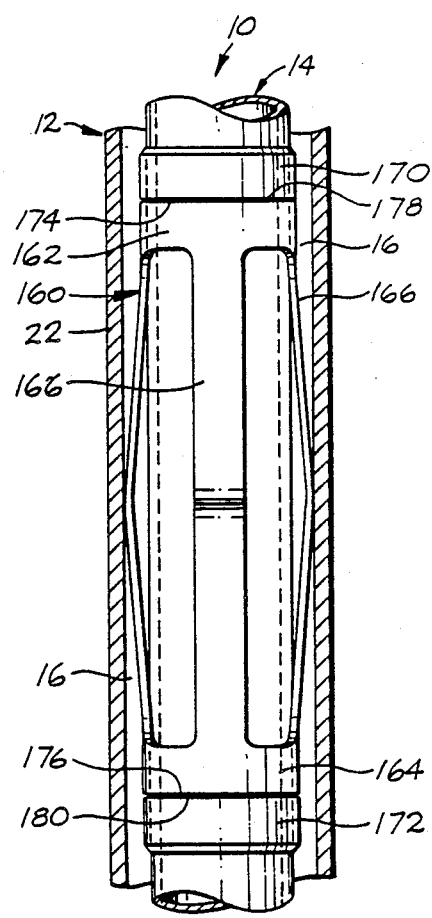
FIG. 8 is a broken cross-sectional view of a portion of a drill pipe assembly showing the spring member of FIG. 7 operatively positioned between the inner and outer pipe members.

For longer lengths of pipe, it has been deemed desirable to provide means for centralizing and stabilizing the inner pipe member within the outer pipe member. To that end, as shown in FIGS. 7 and 8, there may be provided a tubular spring member 160 formed of high grade steel in the annular space 16 between the inner and outer pipe members. The spring member is comprised of a pair of collars 162 and 164 joined by a plurality (four are shown) of equally angularly spaced, outwardly bowed spring portions 166. Collars 162 and 164 are axially split at 168 to facilitate mounting of spring member 160 onto an inner pipe.

A pair of rings 170 and 172, having the same wall thickness as the spring member, are welded to the outer surface of the inner pipe member, as shown in FIG. 8, to provide shoulders 174 and 176 engageable with the opposed ends 178 and 180 of the spring member. The ring members are axially spaced on the inner pipe member to provide a slight axial clearance between the ends of the spring member and the shoulders in the uncompressed condition of the ring member, i.e. prior to assembling the inner pipe member within an outer pipe member. This allows for slight axial extension of the spring member in its compressed condition, i.e. after installation of the inner pipe member within an outer pipe member. In its free or uncompressed condition, the outer diameter of the spring member is larger than the inner diameter of the outer pipe member to allow the spring member to fit tightly between the inner and outer pipe members.

Depending on the length of the pipe members, more than one spring may be provided. When one spring member is used, it should be located approximately midway of the length of the assembly. If more than one spring is used, they should be located at equal distances between the inner pipe supports.

The embodiments of the invention in which an exclusive property or privilege is claimed are defined as follows:

1. An inner pipe member for a dual-wall drill pipe assembly employed in drilling in earth formations, said assembly including an inner pipe member and an outer pipe member, said outer pipe member having main bore extending axially therethrough, a first bore portion and a concentric second bore portion of smaller diameter than said first bore portion and axially spaced therefrom by a shoulder facing axially outwardly of one end of said main bore and a circumferential recess in said second bore portion, said inner pipe member comprising:
    a tubular body portion adapted to be telescopically and concentrically received in said main bore and define with said main bore an annular fluid passage;
    first spacer means at the other end of said body portion for concentrically spacing said other end of said body portion from said one end of said outer pipe member, said first space means including:
        surface means adapted to be received in sliding fit relation within at least one of said first and second bore portions for concentrically positioning said other end of said inner pipe member within said outer pipe member; and
        a projection extending radially outwardly of said surface means and adapted to be received in said recess when said inner pipe member is operatively disposed within said outer pipe member, said projection having an outer surface slidable in said second bore portion in interference fit relation; and
    second spacer means at one end of said body portion for concentrically spacing said one end of said body portion from the other end of said outer pipe member.

2. An inner pipe member as defined in claim 1, said first spacer means comprising a plurality of elongated, axially extending unitary spacer members secured to said other end of said inner pipe member.

3. An inner pipe member as defined in claim 2, said spacer members being equally angularly spaced about said other end of said inner pipe member and defining with said body portion and said main bore a plurality of longitudinally extending fluid channels therebetween.

4. An inner pipe member as defined in claim 3, said surface means including first and second surface means adapted to be received in sliding fit relation within said first and second bore portions, respectively, each said spacer member having a shoulder separating said first and second surface means and being abuttingly engageable with said shoulder separating said first and second bore portions for axially and operatively locating said inner pipe member within said outer pipe member and for transmitting, when said assembly is disposed in an upright position, the weight of said inner pipe member to said outer pipe member.

5. An inner pipe member as defined in claim 1, said projection having an inwardly tapering leading edge for facilitating insertion of said projection into said recess.

6. An inner pipe member as defined in claim 5, said projection having a trailing edge extending at right angles to said outer surface and said second surface and being engageable with said recess for retaining said inner pipe member within said outer pipe member.

7. A dual-wall drill pipe assembly for use in drilling in earth formations, said assembly comprising:
    an outer pipe member having:
        a main bore extending axially therethrough having:
            a first bore portion;
            a concentric second bore portion of smaller diameter than said first bore portion;
            a shoulder axially separating said first and second bore portions and facing axially outwardly of one end of said main bore; and
            a circumferential recess in said second bore portion; and
    an inner pipe member having:
        a tubular body portion adapted to be telescopically and concentrically received in said main bore and define with said main bore an annular fluid passage;
        first spacer means at the other end of said body portion for concentrically spacing said other end of said body portion from said one end of said outer pipe member, said second spacer means including:
            surface means adapted to be received in sliding fit relation within at least one of said first and second bore portions for concentrically positioning said other end of said inner pipe member within said outer pipe member; and
            a projection extending radially outwardly of said surface means and adapted to be received in said recess when said inner pipe member is operatively disposed within said outer pipe member, said projection having an outer surface slidable in said second bore portion in interference fit relation; and
        second spacer means at one end of said body portion for concentrically spacing said one end of said body portion from the other end of said outer pipe member.

8. A dual-wall drill pipe assembly as defined in claim 7, said first spacer means comprising a plurality of elongated, axially extending unitary spacer members secured to said other end of said inner pipe member.

9. A dual-wall drill pipe assembly as defined in claim 8, said spacer members being equally angularly spaced about said other end of said inner pipe member and defining with said body portion and said main bore a plurality of longitudinally extending fluid channels therebetween.

10. A dual-wall drill pipe assembly as defined in claim 9, said surface means including first and second surface means adapted to be received in sliding fit relation within said first and second bore portions, respectively, each said spacer member having a shoulder separating said first and second surface means and being abuttingly engageable with said shoulder separating said first and second bore portions for axially and operatively locating said inner pipe member within said outer pipe member and for transmitting, when said assembly is disposed in an upright position, the weight of said inner pipe member to said outer pipe member.

11. A dual-wall drill pipe assembly as defined in claim 7, said projection having an inwardly tapering leading edge for facilitating insertion of said projection into said recess.

12. A dual-wall drill pipe assembly as defined in claim 11, said projection having a trailing edge extending at right angles to said outer surface and said second surface and being engageable with said recess for retaining said inner pipe member within said outer pipe member.

13. A dual-wall drill pipe assembly as defined in claim 7, further including means for centralizing said inner pipe member within said outer pipe member.

14. A dual-wall drill pipe assembly as defined in claim 13, said centralizing means including a tubular spring member having a pair of axially spaced tubular collars portions and a plurality of outwardly bowed leaf spring portions extending between said collar members, and axially spaced shoulder means formed on the outer surface of said inner pipe member, said spring member being adapted to be concentrically mounted on said inner pipe member between said shoulder means, said leaf spring portions being engageable with the inner surface of said outer pipe member so as to maintain said inner pipe member centrally disposed within said outer pipe member.

15. A dual-wall drill pipe assembly for use in drilling in earth formations, said assembly comprising:
   an inner pipe member having an outer surface; and
   an outer pipe member having an inner surface defining a passage extending axially through said outer pipe member, said inner surface being adapted to receive said inner pipe member in concentrically spaced relation whereby to form an annular fluid flow passage between said inner and outer surfaces; and
   means for maintaining said inner and outer pipe members in predetermined axial relation, said means including:
      a circumferential recess formed in one of said surfaces; and
      a projection extending from the other of said surfaces toward said one surface and being adapted to be received in said recess in said predetermined axial relation of said inner and outer pipe members, said projection being integral with said other surface and dimensioned to form an interference sliding fit with said one surface.

16. A dual-wall drill pipe assembly as defined in claim 15, said projection being machined into said other surface.

17. A dual-wall drill pipe assembly as defined in claim 16, said recess and said projection having mutually engageable edge means for resisting axial displacement of said members.

* * * * *